United States Patent
Jiang et al.

(10) Patent No.: US 8,248,378 B2
(45) Date of Patent: *Aug. 21, 2012

(54) TOUCH PANEL AND DISPLAY DEVICE USING THE SAME

(75) Inventors: Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 814 days.

This patent is subject to a terminal disclaimer.

(21) Appl. No.: 12/286,145

(22) Filed: Sep. 29, 2008

(65) Prior Publication Data

US 2009/0160795 A1 Jun. 25, 2009

(30) Foreign Application Priority Data

Dec. 21, 2007 (CN) .......................... 2007 1 0125407

(51) Int. Cl.
*G06F 3/041* (2006.01)
(52) U.S. Cl. ........................................................ 345/173
(58) Field of Classification Search ........................ None
See application file for complete search history.

(56) References Cited

U.S. PATENT DOCUMENTS

| | | | |
|---|---|---|---|
| 4,659,873 A | 4/1987 | Gibson et al. | |
| 4,922,061 A | 5/1990 | Meadows et al. | |
| 4,933,660 A | 6/1990 | Wynne, Jr. | |
| 5,181,030 A | 1/1993 | Itaya et al. | |
| 5,853,877 A | 12/1998 | Shibuta | |
| 5,861,583 A | 1/1999 | Schediwy et al. | |
| 6,373,472 B1 | 4/2002 | Palalau et al. | |
| 6,423,583 B1 | 7/2002 | Avouris et al. | |
| 6,628,269 B2 | 9/2003 | Shimizu | |
| 6,629,833 B1 | 10/2003 | Ohya et al. | |
| 6,914,640 B2 | 7/2005 | Yu | |
| 6,947,203 B2 | 9/2005 | Kanbe | |
| 7,054,064 B2 | 5/2006 | Jiang et al. | |
| 7,060,241 B2 | 6/2006 | Glatkowski | |

(Continued)

FOREIGN PATENT DOCUMENTS

CN 2539375 3/2003

(Continued)

OTHER PUBLICATIONS

Kai-Li Jiang, Qun-Qing Li, Shou-Shan Fan, "Continuous carbon nanotube yarns and their applications", Physics, China, pp. 506-510, Aug. 31, 2003,32(8)(lines from the 4th line to 35th line in the right col. of p. 507 may be relevant).

(Continued)

*Primary Examiner* — Andrew L Sniezek
(74) *Attorney, Agent, or Firm* — Altis Law Group, Inc.

(57) ABSTRACT

An exemplary touch panel includes a first electrode plate and a second electrode plate separated from the first electrode plate. The first electrode plate includes a first substrate and a first conductive layer located on a lower surface of the first substrate. The second electrode plate includes a second substrate and a second conductive layer located on an upper surface of the second substrate. Each of the first conductive layer and the second conductive layer includes a plurality of carbon nanotube string-shaped structures. A display device incorporates the touch panel and also includes a display element adjacent to the touch panel.

18 Claims, 6 Drawing Sheets

U.S. PATENT DOCUMENTS

| | | | |
|---|---|---|---|
| 7,084,933 B2 * | 8/2006 | Oh et al. | 349/12 |
| 7,196,463 B2 | 3/2007 | Okai et al. | |
| 7,215,329 B2 | 5/2007 | Yoshikawa et al. | |
| 7,242,136 B2 | 7/2007 | Kim et al. | |
| 7,336,261 B2 | 2/2008 | Yu | |
| 7,348,966 B2 | 3/2008 | Hong et al. | |
| 7,532,182 B2 | 5/2009 | Tseng et al. | |
| 7,593,004 B2 | 9/2009 | Spath et al. | |
| 7,630,040 B2 | 12/2009 | Liu et al. | |
| 7,662,732 B2 | 2/2010 | Choi et al. | |
| 7,663,607 B2 | 2/2010 | Hotelling et al. | |
| 7,704,480 B2 | 4/2010 | Jiang et al. | |
| 7,710,649 B2 | 5/2010 | Feng et al. | |
| 7,796,123 B1 | 9/2010 | Irvin, Jr. et al. | |
| 7,825,911 B2 | 11/2010 | Sano et al. | |
| 7,854,992 B2 | 12/2010 | Fu et al. | |
| 7,947,977 B2 | 5/2011 | Jiang et al. | |
| 2002/0089492 A1 | 7/2002 | Ahn et al. | |
| 2003/0122800 A1 * | 7/2003 | Yu | 345/173 |
| 2003/0147041 A1 | 8/2003 | Oh et al. | |
| 2003/0189235 A1 | 10/2003 | Watanabe et al. | |
| 2004/0047038 A1 | 3/2004 | Jiang et al. | |
| 2004/0053780 A1 | 3/2004 | Jiang et al. | |
| 2004/0099438 A1 | 5/2004 | Arthur et al. | |
| 2004/0105040 A1 | 6/2004 | Oh et al. | |
| 2004/0136896 A1 | 7/2004 | Liu et al. | |
| 2004/0191157 A1 | 9/2004 | Harutyunyan et al. | |
| 2004/0251504 A1 | 12/2004 | Noda | |
| 2005/0110720 A1 | 5/2005 | Akimoto et al. | |
| 2005/0151195 A1 | 7/2005 | Kawase et al. | |
| 2005/0209392 A1 | 9/2005 | Luo et al. | |
| 2006/0010996 A1 | 1/2006 | Jordan et al. | |
| 2006/0022221 A1 * | 2/2006 | Furukawa et al. | 257/222 |
| 2006/0044284 A1 | 3/2006 | Tanabe | |
| 2006/0077147 A1 | 4/2006 | Palmateer et al. | |
| 2006/0097991 A1 | 5/2006 | Hotelling et al. | |
| 2006/0171032 A1 | 8/2006 | Nishioka | |
| 2006/0187213 A1 | 8/2006 | Su | |
| 2006/0187369 A1 | 8/2006 | Chang | |
| 2006/0188721 A1 | 8/2006 | Irvin, Jr. et al. | |
| 2006/0213251 A1 | 9/2006 | Rinzler et al. | |
| 2006/0240605 A1 | 10/2006 | Moon et al. | |
| 2006/0262055 A1 | 11/2006 | Takahara | |
| 2006/0263588 A1 | 11/2006 | Handa et al. | |
| 2006/0274047 A1 | 12/2006 | Spath et al. | |
| 2006/0274048 A1 * | 12/2006 | Spath et al. | 345/173 |
| 2006/0274049 A1 | 12/2006 | Spath et al. | |
| 2006/0275956 A1 | 12/2006 | Konesky | |
| 2006/0278444 A1 | 12/2006 | Binstead | |
| 2007/0065651 A1 | 3/2007 | Glatkowski et al. | |
| 2007/0075619 A1 * | 4/2007 | Jiang et al. | 313/336 |
| 2007/0081681 A1 | 4/2007 | Yu et al. | |
| 2007/0099333 A1 | 5/2007 | Moriya | |
| 2007/0165004 A1 | 7/2007 | Seelhammer et al. | |
| 2007/0182720 A1 | 8/2007 | Fujii et al. | |
| 2007/0215841 A1 | 9/2007 | Ford et al. | |
| 2007/0257894 A1 | 11/2007 | Philipp | |
| 2007/0262687 A1 | 11/2007 | Li | |
| 2007/0279556 A1 | 12/2007 | Wang et al. | |
| 2007/0296897 A1 | 12/2007 | Liu et al. | |
| 2007/0298253 A1 | 12/2007 | Hata et al. | |
| 2008/0029292 A1 | 2/2008 | Takayama et al. | |
| 2008/0088219 A1 | 4/2008 | Yoon et al. | |
| 2008/0129666 A1 | 6/2008 | Shimotono et al. | |
| 2008/0138589 A1 | 6/2008 | Wakabayashi et al. | |
| 2008/0192014 A1 | 8/2008 | Kent et al. | |
| 2008/0238882 A1 | 10/2008 | Sivarajan et al. | |
| 2008/0266273 A1 | 10/2008 | Slobodin et al. | |
| 2009/0032777 A1 | 2/2009 | Kitano et al. | |
| 2009/0056854 A1 | 3/2009 | Oh et al. | |
| 2009/0059151 A1 | 3/2009 | Kim et al. | |
| 2009/0101488 A1 | 4/2009 | Jiang et al. | |
| 2009/0153511 A1 | 6/2009 | Jiang et al. | |
| 2009/0208708 A1 | 8/2009 | Wei et al. | |
| 2009/0283211 A1 | 11/2009 | Matsuhira | |
| 2009/0293631 A1 | 12/2009 | Radivojevic | |
| 2010/0001972 A1 | 1/2010 | Jiang et al. | |
| 2010/0001976 A1 | 1/2010 | Jiang et al. | |
| 2010/0007619 A1 | 1/2010 | Jiang et al. | |
| 2010/0007624 A1 | 1/2010 | Jiang et al. | |
| 2010/0007625 A1 | 1/2010 | Jiang et al. | |
| 2010/0065788 A1 | 3/2010 | Momose et al. | |
| 2010/0078067 A1 | 4/2010 | Jia et al. | |
| 2010/0093247 A1 | 4/2010 | Jiang et al. | |
| 2010/0171099 A1 | 7/2010 | Tombler, Jr. et al. | |
| 2010/0271330 A1 | 10/2010 | Philipp | |
| 2011/0032196 A1 | 2/2011 | Feng et al. | |

FOREIGN PATENT DOCUMENTS

| | | |
|---|---|---|
| CN | 1447279 | 10/2003 |
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292352 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1982209 | 6/2007 |
| CN | 1996620 | 7/2007 |
| CN | 1998067 | 7/2007 |
| CN | 101017417 | 8/2007 |
| CN | 101059738 | 10/2007 |
| CN | 101165883 | 4/2008 |
| DE | 202007006407 | 9/2007 |
| EP | 1739692 | 1/2007 |
| JP | S61-231626 | 10/1986 |
| JP | S62-63332 | 3/1987 |
| JP | S62-182916 | 8/1987 |
| JP | S62-190524 | 8/1987 |
| JP | H2-8926 | 1/1990 |
| JP | 1991-54624 | 3/1991 |
| JP | H3-54624 | 3/1991 |
| JP | 5-53715 | 3/1993 |
| JP | H06-28090 | 2/1994 |
| JP | H6-67788 | 3/1994 |
| JP | 8-287775 | 11/1996 |
| JP | H10-63404 | 3/1998 |
| JP | 2001-34419 | 2/2001 |
| JP | 2001-267782 | 9/2001 |
| JP | 2002-278701 | 9/2002 |
| JP | 2003-99192 | 4/2003 |
| JP | 2003-99193 | 4/2003 |
| JP | 2003-288164 | 10/2003 |
| JP | 2003303978 | 10/2003 |
| JP | 2004-26532 | 1/2004 |
| JP | 2004-102217 | 4/2004 |
| JP | 2004-189573 | 7/2004 |
| JP | 2004-253796 | 9/2004 |
| JP | 2004-266272 | 9/2004 |
| JP | 2005-67976 | 3/2005 |
| JP | 2005-85485 | 3/2005 |
| JP | 2005-176428 | 6/2005 |
| JP | 2005-182339 | 7/2005 |
| JP | 2005-222182 | 8/2005 |
| JP | 2005-286158 | 10/2005 |
| JP | 2006-171336 | 6/2006 |
| JP | 2006-228818 | 8/2006 |
| JP | 2006-243455 | 9/2006 |

| | | |
|---|---|---|
| JP | 2006-521998 | 9/2006 |
| JP | 2006-269311 | 10/2006 |
| JP | 2006-285068 | 10/2006 |
| JP | 2007-11997 | 1/2007 |
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |
| JP | 2007-182357 | 7/2007 |
| JP | 2007-182546 | 7/2007 |
| JP | 2007-229989 | 9/2007 |
| JP | 2007-310869 | 11/2007 |
| JP | 2008-102968 | 5/2008 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| KR | 2007-0108077 | 11/2007 |
| TW | 131955 | 4/1990 |
| TW | 341684 | 10/1998 |
| TW | 521227 | 2/2003 |
| TW | 200403498 | 3/2004 |
| TW | 242732 | 9/2004 |
| TW | 200518195 | 6/2005 |
| TW | I233570 | 6/2005 |
| TW | I234676 | 6/2005 |
| TW | 200522366 | 7/2005 |
| TW | 284963 | 1/2006 |
| TW | I249134 | 2/2006 |
| TW | I249708 | 2/2006 |
| TW | I251710 | 3/2006 |
| TW | I253846 | 4/2006 |
| TW | 200622432 | 7/2006 |
| TW | I261716 | 9/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | 200722559 | 6/2007 |
| TW | 200727163 | 7/2007 |
| TW | 284927 | 8/2007 |
| TW | 200729241 | 8/2007 |
| TW | 200737414 | 10/2007 |
| TW | 200738558 | 10/2007 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005104141 | 11/2005 |
| WO | WO2006003245 | 1/2006 |
| WO | WO2006014241 | 2/2006 |
| WO | WO2006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |
| WO | WO2008013517 | 1/2008 |

OTHER PUBLICATIONS

Yu Xiang, Technique of Touch Panel & the Production of Resistance-type Touch Panel Insulation Dot, Journal of Longyan Teachers College, p. 25-26, vol. 22, No. 6, 2004.
George Gruner, "Carbon Nanonets Spark New Electronics", Scientific American, pp. 76-83, May 2007.
Yagasaki Takuya, Nakanishi Rou, "Resistance Film Type Touch Panel", Technologies and Developments of Touch Panels, Amc, First Impression, pp. 80-93, Dec. 27, 2004(the 2nd Paragraph on p. 81 and the 2nd Paragraph on p. 91 may be relevant).
Yoshikazu Nakayama, "Technology Development of CNT Long Yarns and CNT Sheets", Nano Carbon Handbook, Japan TSN Inc, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).
Mei Zhang etal., "Strong Transparent, Multifunctional, Carbon Nanotube Sheets", Science, America, AAAS, vol. 309, pp. 1215-1219, Aug. 19, 2005.
Ri Kurosawa, "Technology Trends of Capacitive Touch Panel", Technology and Development of Touch Panel, Amc, First Impression, pp. 54-64, Dec. 27, 2004(the 6th paragraph on p. 55 may be relevant).
Wu et al."Transparent, Conductive Carbon Nanotube Films". Science,vol. 305,(2004);pp. 1273-1276.
Susuki et al. "Investigation of physical and electric properties of silver pastes as binder for thermoelectric materials". Review of Scientific Instruments,76,(2005);pp. 023907-1 to 023907-5.
ASM Handbook."vol. 2 Properties and Selection: Nonferrous Alloys and Special-Purpose Materials".Apr. 2007; pp. 840-853.
Fan et al. "Self-Oriented Regular Arrays of Carbon Nanotubes and Their Field Emission Properties". Science, vol. 283, (1999); pp. 512-514.

* cited by examiner

TOUCH PANEL AND DISPLAY DEVICE USING THE SAME

RELATED APPLICATIONS

This application is related to commonly-assigned applications entitled, "TOUCH PANEL", filed Sep. 29, 2008 Ser. No. 12/286,266; "TOUCH PANEL", filed Sep. 29, 2008 Ser. No. 12/286,141; "TOUCH PANEL AND DISPLAY DEVICE USING THE SAME", filed Sep. 29, 2008 Ser. No. 12,286,189; "TOUCH PANEL AND DISPLAY DEVICE USING THE SAME", filed Sep. 29, 2008 Ser. No. 12/286, 181; "TOUCH PANEL AND DISPLAY DEVICE USING THE SAME", filed Sep. 29 2008 Ser. No. 12/286,179; "TOUCH PANEL AND DISPLAY DEVICE USING THE SAME", filed Sep. 29, 2008 Ser. No. 12,286,166; "TOUCH PANEL AND DISPLAY DEVICE USING THE SAME", filed Sep. 29, 2008 Ser. No. 12/286,178; "TOUCH PANEL AND DISPLAY DEVICE USING THE SAME", filed Sep. 29, 2008 Ser. No. 12/286,148; "TOUCHABLE CONTROL DEVICE", filed Sep. 29, 2008 Ser. No. 12/286,140; "TOUCH PANEL AND DISPLAY DEVICE USING THE SAME", filed Sep. 29, 2008 Ser. No. 12/286,154; "TOUCH PANEL AND DISPLAY DEVICE USING THE SAME", filed Sep. 29, 2008 Ser. No. 12/286,216; "TOUCH PANEL AND DISPLAY DEVICE USING THE SAME", filed Sep. 29, 2008 Ser. No. 12/286,152; "TOUCH PANEL AND DISPLAY DEVICE USING THE SAME", Sep. 29, 2008 Ser. No. 12/286,179; "TOUCH PANEL, METHOD FOR MAKING THE SAME, AND DISPLAY DEVICE ADOPTING THE SAME", filed Sep. 29, 2008 Ser. No. 12/286,155; "TOUCH PANEL AND DISPLAY DEVICE USING THE SAME", filed Sep. 29, 2008 Ser. No. 12/286,146; "TOUCH PANEL, METHOD FOR MAKING THE SAME, AND DISPLAY DEVICE ADOPTING THE SAME", filed Sep. 29, 2008 Ser. No. 12/286,228; "TOUCH PANEL AND DISPLAY DEVICE USING THE SAME", filed Sep. 29, 2008 Ser. No. 12/286,153; "TOUCH PANEL AND DISPLAY DEVICE USING THE SAME", filed Sep. 29, 2008 Ser. No. 12/286, 184; "METHOD FOR MAKING TOUCH PANEL", filed Sep. 29, 2008 Ser. No. 12/286,175; "METHOD FOR MAKING TOUCH PANEL", filed Sep. 29, 2008 Ser. No. 12/286, 195; "TOUCH PANEL AND DISPLAY DEVICE USING THE SAME", filed Sep. 29, 2008 Ser. No. 12/286,160; "TOUCH PANEL AND DISPLAY DEVICE USING THE SAME", filed Sep. 29, 2008 Ser. No. 12/286,220; "TOUCH PANEL AND DISPLAY DEVICE USING THE SAME", filed Sep. 29, 2008 Ser. No. 12/286,227; "TOUCH PANEL AND DISPLAY DEVICE USING THE SAME", filed Sep. 29, 2008 Ser. No. 12/286,144; "TOUCH PANEL AND DISPLAY DEVICE USING THE SAME", filed Sep. 29, 2008 Ser. No. 12/286,218; "TOUCH PANEL AND DISPLAY DEVICE USING THE SAME", filed Sep. 29, 2008 Ser. No. 12/286,142; "TOUCH PANEL AND DISPLAY DEVICE USING THE SAME", filed Sep. 29, 2008 Ser. No. 12/286, 241; "TOUCH PANEL, METHOD FOR MAKING THE SAME, AND DISPLAY DEVICE ADOPTING THE SAME", filed Sep. 29, 2008 Ser. No. 12/286,151; "ELECTRONIC ELEMENT HAVING CARBON NANOTUBES", filed Sep. 29, 2008 Ser. No. 12/286,143; and "TOUCH PANEL, METHOD FOR MAKING THE SAME, AND DISPLAY DEVICE ADOPTING THE SAME", filed Sep. 29, 2008 Ser. No. 12/286,219. The disclosures of the above-identified applications are incorporated herein by reference.

BACKGROUND

1. Field of the Invention

The present invention relates to touch panels and, particularly, to a carbon nanotube based touch panel and a display device incorporating the same.

2. Discussion of Related Art

Following the advancement in recent years of various electronic apparatuses, such as mobile phones, car navigation systems and the like, toward high performance and diversification, there has been continuous growth in the number of electronic apparatuses equipped with optically transparent touch panels at the front of their respective display devices (e.g., liquid crystal panels). A user of any such electronic apparatus operates it by pressing or touching the touch panel with a finger, a pen, a stylus, or a like tool while visually observing the display device through the touch panel. Therefore, a demand exists for touch panels that are superior in visibility and reliable in operation.

At present, different types of touch panels, including resistance, capacitance, infrared, and surface sound-wave types have been developed. Due to their high accuracy and low cost of production, resistance-type touch panels have been widely used.

A conventional resistance-type touch panel includes an upper substrate, a transparent upper conductive layer formed on a lower surface of the upper substrate, a lower substrate, a transparent lower conductive layer formed on an upper surface of the lower substrate, and a plurality of dot spacers formed between the transparent upper conductive layer and the transparent lower conductive layer. The transparent upper conductive layer and the transparent lower conductive layer are formed of electrically conductive indium tin oxide (ITO).

In operation, an upper surface of the upper substrate is pressed with a finger, a pen, or a like tool, and visual observation of a screen on the liquid crystal display device provided on a back side of the touch panel is provided. This causes the upper substrate to be deformed, and the upper conductive layer thus comes in contact with the lower conductive layer at the position where the pressing occurs. Voltages are separately applied by an electronic circuit to the transparent upper conductive layer and the transparent lower conductive layer. Thus, the deformed position can be detected by the electronic circuit.

Each of the transparent conductive layers (e.g., ITO layers) is generally formed by means of ion-beam sputtering, and this method is relatively complicated. Additionally, the ITO layer has poor wearability/durability, low chemical endurance, and uneven resistance over an entire area of the touch panel. Furthermore, the ITO layer has relatively low transparency. All the above-mentioned problems of the ITO layer make for a touch panel with low sensitivity, accuracy, and brightness.

What is needed, therefore, is to provide a durable touch panel and a display device using the same with high sensitivity, accuracy, and brightness.

SUMMARY

In one embodiment, a touch panel includes a first electrode plate, and a second electrode plate separated from the first electrode plate. The first electrode plate includes a first substrate and a first conductive layer located on a lower surface of the first substrate. The second electrode plate includes a second substrate and a second conductive layer located on an upper surface of the second substrate. At least one of the first conductive layer and the second conductive layer includes a plurality of carbon nanotube string-shaped structures.

Other advantages and novel features of the present touch panel and display device using the same will become more apparent from the following detailed description of exemplary embodiments when taken in conjunction with the accompanying drawings.

BRIEF DESCRIPTION OF THE DRAWINGS

Many aspects of the present touch panel and display device using the same can be better understood with reference to the following drawings. The components in the drawings are not necessarily to scale, the emphasis instead being placed upon clearly illustrating the principles of the present touch panel and display device using the same.

Figure 1:
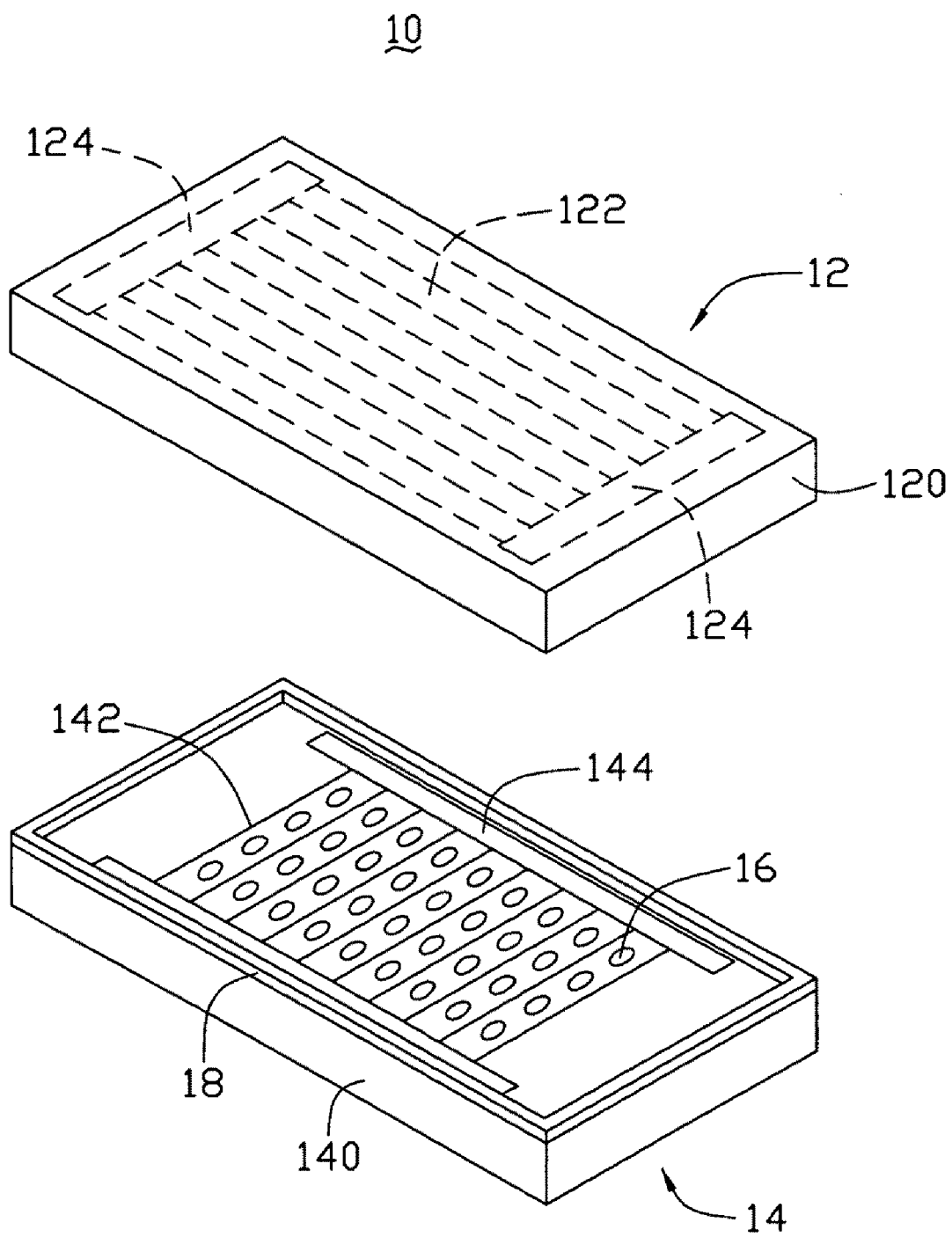
FIG. 1 is an exploded, isometric view of a touch panel in accordance with a present embodiment, showing a first substrate thereof inverted.

Corresponding reference characters indicate corresponding parts throughout the several views. The exemplifications set out herein illustrate at least one embodiment of the present touch panel and display device using the same, in at least one form, and such exemplifications are not to be construed as limiting the scope of the invention in any manner.

DETAILED DESCRIPTION OF EXEMPLARY EMBODIMENTS

Reference will now be made to the drawings to describe, in detail, embodiments of the present touch panel and display device using the same.

Figure 2:
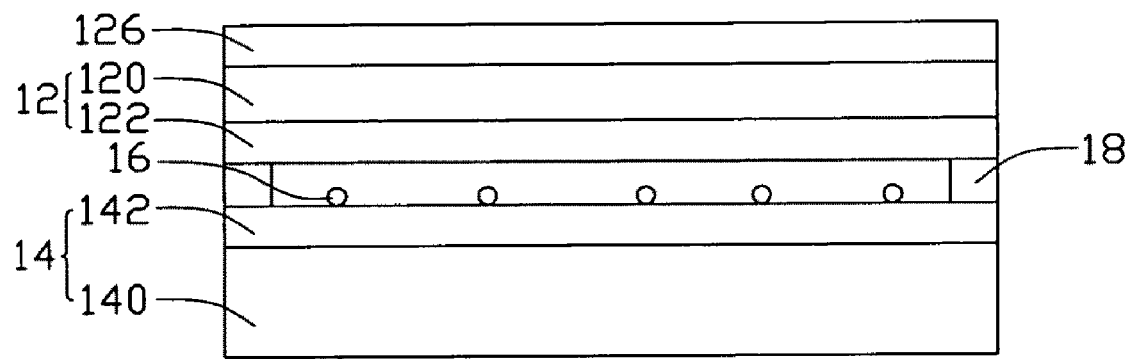
FIG. 2 is a transverse, cross-sectional view of the touch panel of FIG. 1 once assembled.

Referring to FIG. 1 and FIG. 2, a touch panel 10 includes a first electrode plate 12, a second electrode plate 14, and a plurality of dot spacers 16 located between the first electrode plate 12 and the second electrode plate 14.

The first electrode plate 12 includes a first substrate 120, a first conductive layer 122, and two first-electrodes 124. The first substrate 120 includes an upper surface and a lower surface, each of which is substantially flat. The two first-electrodes 124 and the first conductive layer 122 are located on the lower surface of the first substrate 120. The two first-electrodes 124 are located separately on opposite ends of the first conductive layer 122. A direction from one of the first-electrodes 124 across the first conductive layer 122 to the other first-electrode 124 is defined as a first direction. The two first-electrodes 124 are electrically connected with the first conductive layer 122.

The second electrode plate 14 includes a second substrate 140, a second conductive layer 142, and two second-electrodes 144. The second substrate 140 includes an upper surface and a lower surface, each of which is substantially flat. The two second-electrodes 144 and the second conductive layer 142 are located on the upper surface of the second substrate 140. The two second-electrodes 144 are located separately on opposite ends of the second conductive layer 142. A direction from one of the second-electrodes 144 across the second conductive layer 142 to the other second-electrode 144 is defined as a second direction. The two second-electrodes 144 are electrically connected with the second conductive layer 142.

The first direction is perpendicular to the second direction. That is, the two first-electrodes 124 are aligned parallel to the second direction, and the two second-electrodes 144 aligned parallel to the first direction. The first substrate 120 is a transparent and flexible film/plate. The second substrate 140 is a transparent plate. The first-electrodes 124 and the second-electrodes 144 are made of metal or any other suitable conductive material. In the present embodiment, the first substrate 120 is a polyester film, the second substrate 140 is a glass plate, and the first-electrodes 124 and second-electrodes 144 are made of a conductive silver paste.

An insulative layer 18 is provided on the four edges of the upper surface of the second electrode plate 14. The first electrode plate 12 is located on the insulative layer 18. The first conductive layer 122 is opposite to, but is spaced from, the second conductive layer 142. The dot spacers 16 are separately located on the second conductive layer 142. A distance between the second electrode plate 14 and the first electrode plate 12 is in an approximate range from 2 to 20 microns. The insulative layer 18 and the dot spacers 16 are made of, for example, insulative resin or any other suitable insulative material. Insulation between the first electrode plate 12 and the second electrode plate 14 is provided by the insulative layer 18 and the dot spacers 16. It is to be understood that the dot spacers 16 are optional, particularly when the touch panel 10 is relatively small.

A transparent protective film 126 is located on the upper surface of the first electrode plate 12. The material of the transparent protective film 126 can be selected from the group consisting of silicon nitrides, silicon dioxides, benzocyclobutenes, polyester films, and polyethylene terephthalates. The transparent protective film 126 can be made of slick plastic and receive a surface hardening treatment to protect the first electrode plate 12 from being scratched when in use.

Figure 3:
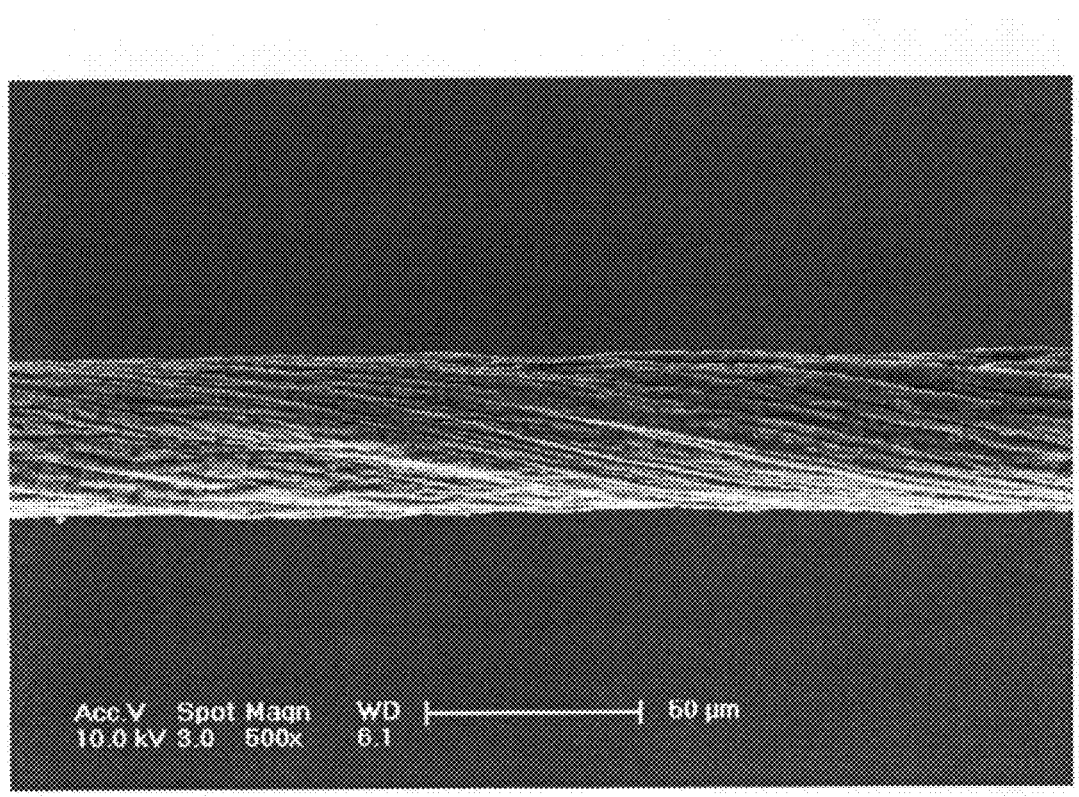
FIG. 3 shows a Scanning Electron Microscope (SEM) image of a carbon nanotube string used in the touch panel of FIG. 1.

At least one of the first conductive layer 122 and the second conductive layer 142 includes a plurality of carbon nanotube string-shaped structures. The carbon nanotube string-shaped structure can be a carbon nanotube string. Referring to FIG. 3, the carbon nanotube string is composed of a plurality of successively carbon nanotubes joined end to end by van der Waals attractive force therebetween and are one or more nanotubes in thickness. The carbon nanotube strings can parallel to each other and spaced apart from each other. The length of the carbon nanotube string can be arbitrarily set as desired. A diameter of each carbon nanotube string is in an approximate range from 0.5 nanometers to 100 micrometers (μm). Distances between adjacent carbon nanotube strings are in an approximate range from 10 nanometers to 1 millimeter. The carbon nanotubes in the carbon nanotube strings can be selected from a group consisting of single-walled, double-walled, and multi-walled carbon nanotubes. A diameter of each single-walled carbon nanotube approximately ranges from 0.5 nanometers to 50 nanometers. A diameter of each double-walled carbon nanotube approximately ranges from 1 nanometer to 50 nanometers. A diameter of each multi-walled carbon nanotube approximately ranges from 1.5 nanometers to 50 nanometers. It can be understood that the carbon nanotubes also can be contactly located side by side.

In the present embodiment, the first conductive layer 122 and the second conductive layer 142 both include a plurality of spaced carbon nanotube strings parallel to each other. The carbon nanotube strings in the first conductive layer 122 are each parallel to the first direction, and the arranged directions of the carbon nanotube strings in the second conductive layer 142 are each parallel to the second direction. Thus, the carbon nanotube strings in the first conductive layer 122 cross the carbon nanotube strings in the second conductive layer 142. In this embodiment, the first direction is perpendicular to the second direction; however, other arrangements can be made.

An exemplary method for fabricating each of the above-described the first conductive layer 122 and the second conductive layer 142 includes the steps of: (a) providing an array of carbon nanotubes or providing a super-aligned array of carbon nanotubes; (b) pulling out a carbon nanotube structure from the array of carbon nanotubes, by using a tool (e.g., adhesive tape, pliers, tweezers, or another tool allowing multiple carbon nanotubes to be gripped and pulled simultaneously); and (c) treating the carbon nanotube structure with an organic solvent or mechanical force to form a carbon nanotube string; and (d) placing a plurality of the carbon nanotube strings in parallel and space apart from one another on each of the first substrate 120 and the second substrate 140, thereby forming a first conductive layer 122 on the first substrate 120 and a second conductive layer 142 on the second substrate 140.

The method of fabricating a nanotube film comprises steps (a) and (b). A nanotube film can be used as a shielding layer.

In step (a), a given super-aligned array of carbon nanotubes can be formed by the substeps of: (a1) providing a substantially flat and smooth substrate; (a2) forming a catalyst layer on the substrate; (a3) annealing the substrate with the catalyst layer in air at a temperature in an approximate range from 700° C. to 900° C. for about 30 to 90 minutes; (a4) heating the substrate with the catalyst layer to a temperature in the approximate range from 500° C. to 740° C. in a furnace with a protective gas therein; and (a5) supplying a carbon source gas to the furnace for about 5 to 30 minutes and growing the super-aligned array of carbon nanotubes on the substrate.

In step (a1), the substrate can be a P-type silicon wafer, an N-type silicon wafer, or a silicon wafer with a film of silicon dioxide thereon. In this embodiment, a 4-inch P-type silicon wafer is used as the substrate.

In step (a2), the catalyst can be made of iron (Fe), cobalt (Co), nickel (Ni), or any alloy thereof.

In step (a4), the protective gas can be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can have a height of about 50 microns to 5 millimeters and include a plurality of carbon nanotubes parallel to each other and approximately perpendicular to the substrate. The carbon nanotubes in the array of carbon nanotubes can be selected from a group consisting of single-walled carbon nanotubes, double-walled carbon nanotubes, and multi-walled carbon nanotubes. A diameter of each single-walled carbon nanotube approximately ranges from 0.5 nanometers to 50 nanometers. A diameter of each double-walled carbon nanotube approximately ranges from 1 nanometer to 50 nanometers. A diameter of each multi-walled carbon nanotube approximately ranges from 1.5 nanometers to 50 nanometers.

The super-aligned array of carbon nanotubes formed under the above conditions is essentially free of impurities such as carbonaceous or residual catalyst particles. The carbon nanotubes in the super-aligned array are closely packed together by the van der Waals attractive force.

In step (b), the carbon nanotube structure can be formed by the substeps of: (b1) selecting a plurality of carbon nanotube segments having a predetermined width from the array of carbon nanotubes; and (b2) pulling the carbon nanotube segments at an even/uniform speed to achieve a uniform carbon nanotube structure.

Figure 4:
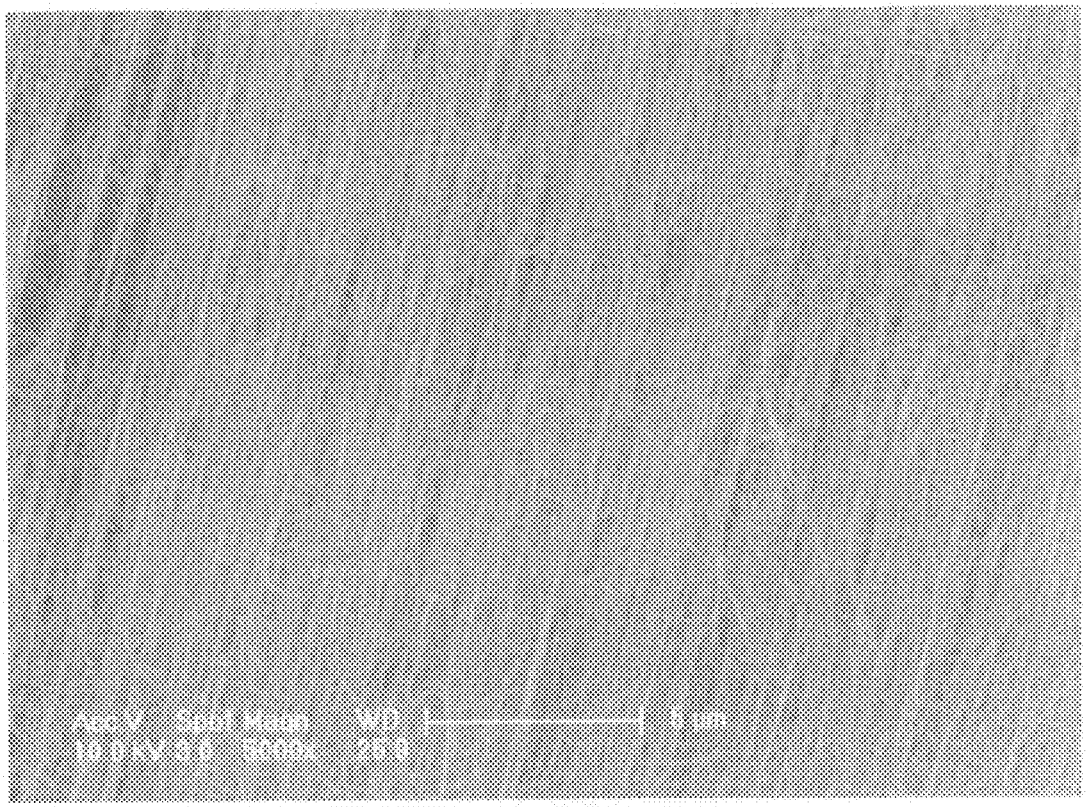
FIG. 4 shows a Scanning Electron Microscope (SEM) image of a carbon nanotube film.
Figure 5:
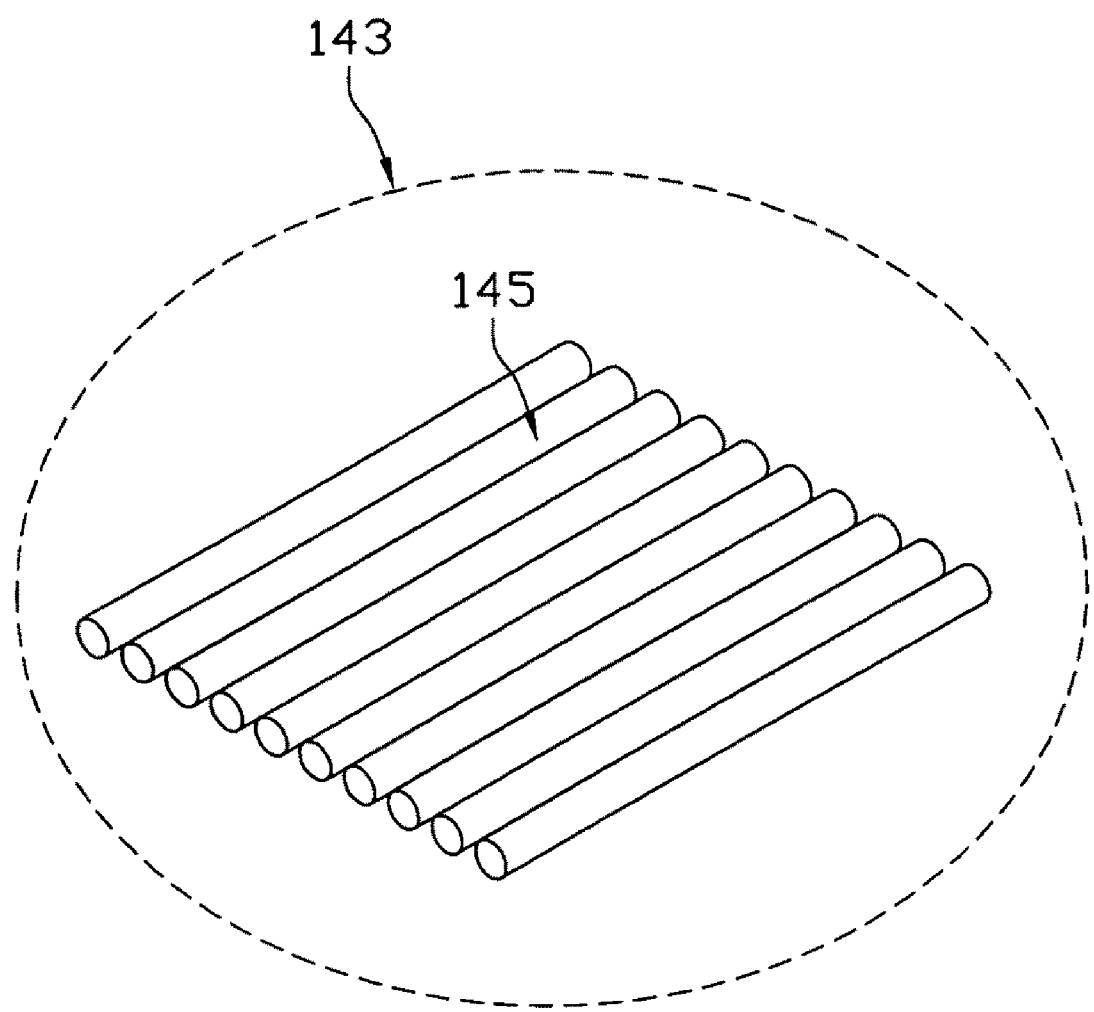
FIG. 5 is a structural schematic of a carbon nanotube segment.

In step (b1), the carbon nanotube segments can be selected by using a tool, such as adhesive tapes, pliers, tweezers, or another tools allowing multiple carbon nanotubes to be gripped and pulled simultaneously to contact with the super-aligned array. Referring to FIG. 4 and FIG. 5, each carbon nanotube segment 143 includes a plurality of carbon nanotubes 145 parallel to each other, and combined by van der Waals attractive force therebetween. The carbon nanotube segments 145 can vary in width, thickness, uniformity and shape. In step (b2), the pulling direction is substantially perpendicular to the growing direction of the super-aligned array of carbon nanotubes.

More specifically, during the pulling process, as the initial carbon nanotube segments 143 are drawn out, other carbon nanotube segments 143 are also drawn out end to end due to the van der Waals attractive force between ends of adjacent carbon nanotube segments 143. This process of drawing ensures a continuous, uniform carbon nanotube structure can be formed. The pulling/drawing method is simple, fast, and suitable for industrial applications.

In step (c), the carbon nanotube structure is soaked in an organic solvent. Since the untreated carbon nanotube structure is composed of a number of carbon nanotubes 145, the untreated carbon nanotube structure has a high surface area to volume ratio and thus may easily become stuck to other objects. During the surface treatment, the carbon nanotube structure is shrunk into a carbon nanotube string after the organic solvent volatilizing, due to factors such as surface tension. The surface area to volume ratio and diameter of the treated carbon nanotube string is reduced. Accordingly, the stickiness of the carbon nanotube structure is lowered or eliminated, and strength and toughness of the carbon nanotube structure is improved. The organic solvent may be a volatilizable organic solvent, such as ethanol, methanol, acetone, dichloroethane, chloroform, and any combination thereof. A diameter of the carbon nanotube strings approximately ranges from 0.5 nanometers to 100 micrometers (μm).

In step (c), the carbon nanotube structure also can be treated with mechanical force (e.g., a conventional spinning process), to acquire a carbon nanotube string in a twisted shape.

In step (d), distances between the carbon nanotube strings can be set according to the optical transparent property of the touch panel. In the present embodiment, distances between the carbon nanotube strings are in an approximate range from 10 nanometers to 1 millimeter.

In step (d), the two ends of the carbon nanotube strings of the first conductive layer 122 are connected to the two first-electrodes 124, and the two ends of the carbon nanotube strings of the second conductive layer 142 are connected to the two second-electrodes 144. The alignment directions of the carbon nanotube strings in the first conductive layer 122 cross with that of the carbon nanotube strings in the second conductive layer 142. The arranged direction of the carbon nanotube strings in the first conductive layer 122 can deflect from the first direction. In this embodiment, the carbon nanotube strings in the first conductive layer 122 spaced apart and arranged along the first direction. The arranged direction of the carbon nanotube strings in the second conductive layer 142 can deflect from the second direction. In this embodiment, the carbon nanotube strings in the second conductive layer 142 are spaced apart and arranged along the second direction. The second-electrodes 124 and the second-electrodes 144 are strip-shaped structure. In this embodiment, the first direction is perpendicular to the second direction.

The touch panel 10 can include a shielding layer (not shown) located on the lower surface of the second substrate 140. The material of the shielding layer can be indium tin oxides, antimony tin oxides, carbon nanotube films, and other conductive materials. In the present embodiment, the shielding layer is a carbon nanotube film. The carbon nanotube film includes a plurality of carbon nanotubes 145, and the orientation of the carbon nanotubes 145 therein can be arbitrary. In the present embodiment, the carbon nanotubes 145 in the carbon nanotube film of the shielding layer are arranged along a same direction. The carbon nanotube film is connected to ground and acts as a shield, thus, enabling the touch panel 10 to operate without interference (e.g., electromagnetic interference).

Figure 6:
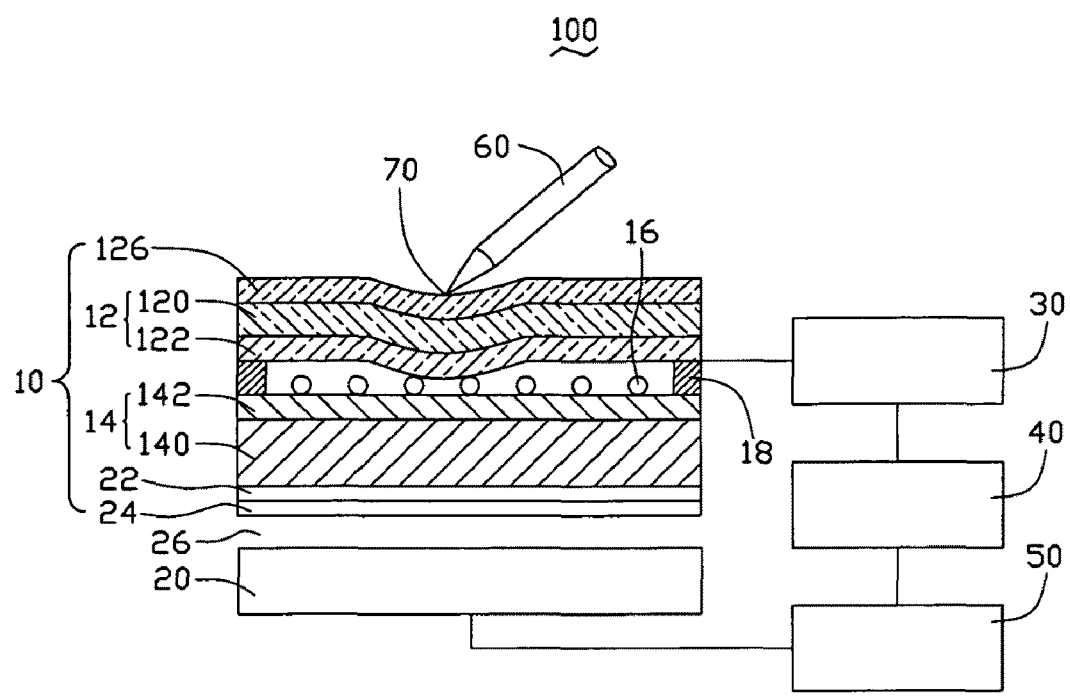
FIG. 6 is essentially a schematic cross-sectional view of the touch panel of the present embodiment used with a display element of a display device, showing operation of the touch panel with a touch tool.

Referring to FIG. 6, a display device 100 includes the touch panel 10, a display element 20, a first controller 30, a central processing unit (CPU) 40, and a second controller 50. The touch panel 10 is opposite and adjacent to the display element 20, and is connected to the first controller 30 by an external circuit. The touch panel 10 can be spaced from the display element 20 or installed directly on the display element 20. In the illustrated embodiment, the touch panel 10 is spaced from the display element 20, with a gap 26. The first controller 30, the CPU 40, and the second controller 50 are electrically connected. The CPU 40 is connected to the second controller 50 to control the display element 20.

The display element 20 can be, e.g., a liquid crystal display, a field emission display, a plasma display, an electroluminescent display, a vacuum fluorescent display, a cathode ray tube, or another display device.

When a shielding layer 22 is located on the lower surface of the second substrate 140, a passivation layer 24 is located on a surface of the shielding layer, on the side away from the second substrate 140. The material of the passivation layer 24 can, for example, be silicon nitride or silicon dioxide. The passivation layer 24 can be spaced from the display element 20 a certain distance or can be installed on the display element 20. The passivation layer 24 can protect the shielding layer 22 from chemical or mechanical damage.

In operation, 5V are applied to each of the two first-electrodes 124 of the first electrode plate 12 and to each of the two second-electrodes 144 of the second electrode plate 14. A user operates the display by pressing the first electrode plate 12 of the touch panel 10 with a finger, a pen/stylus 60, or the like while visually observing the display element 20 through the touch panel 10. This pressing causes a deformation 70 of the first electrode plate 12. The deformation 70 of the first electrode plate 12 causes a connection between the first conductive layer 122 and the second conduction layer 142 of the second electrode plate 14. Changes in voltages in the first direction of the first conductive layer 142 and the second direction of the second conductive layer 142 can be detected by the first controller 30. Then the first controller 30 transforms the changes in voltages into coordinates of the pressing point, and sends the coordinates of the pressing point to the CPU 40. The CPU 40 then sends out commands according to the coordinates of the pressing point and further controls the display of the display element 20.

The properties of the carbon nanotubes 145 provide superior toughness, high mechanical strength, and uniform conductivity to the carbon nanotube strings. Thus, the touch panel 10 and the display device 100 using the carbon nanotube strings as the conductive layer are durable and highly conductive. Furthermore, since the carbon nanotubes 145 have excellent electrical conductivity properties, each of the first and second conductive layers 122, 142 formed by a plurality of carbon nanotube strings parallel to each other and spaced apart from each other has a uniform resistance distribution. Thus, the touch panel 10 and the display device 100 have improved sensitivity and accuracy.

It is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

It is also to be understood that claims drawn to a method may include some indication in reference to certain steps. However, the indication used is only to be viewed for identification purposes and not as a suggestion as to of order for the steps.

What is claimed is:

1. A touch panel comprising:
a first electrode plate comprising a first substrate and a first conductive layer located on a lower surface of the first substrate; and
a second electrode plate separated from the first electrode plate and comprising a second substrate and a second conductive layer located on an upper surface of the second substrate;
wherein at least one of the first and the second conductive layers comprises a plurality of carbon nanotube string-shaped structures spaced from each other, and each of the plurality of carbon nanotube string-shaped structures comprises a plurality of carbon nanotubes joined end to end by van der Waals attractive force, so that each of the plurality of carbon nanotube string-shaped structures having a length longer than a length of one carbon nanotube.

2. The touch panel as claimed in claim 1, wherein the plurality of carbon nanotube string-shaped structures are parallel to each other.

3. The touch panel as claimed in claim 1, wherein a diameter of the carbon nanotube string shaped structure approximately ranges from about 0.5 nanometers to about 100 micrometers.

4. The touch panel as claimed in claim 1, wherein the plurality of carbon nanotubes are selected from the group consisting of single-walled carbon nanotubes, double-walled carbon nanotubes, and multi-walled carbon nanotubes.

5. The touch panel as claimed in claim 1, wherein each of the plurality of carbon nanotube string-shaped structures is a carbon nanotube string, the first conductive layer comprises a first plurality of carbon nanotube strings parallel to each other, and the second conductive layer comprises a second plurality of carbon nanotube strings parallel to each other; the first plurality of carbon nanotube strings is not parallel with the second plurality of carbon nanotube strings.

6. The touch panel as claimed in claim 5, wherein the first electrode plate further comprises two first-electrodes located separately at opposite ends of the first conductive layer thereof and aligned along a first alignment direction, a second alignment direction is perpendicular to the first alignment direction, and each of the two first-electrodes is oriented along the second alignment direction and electrically connected to the first conductive layer.

7. The touch panel as claimed in claim 6, wherein the second electrode plate further comprises two second-electrodes located separately at opposite ends of the second conductive layer thereof, and each of the two second-electrodes is oriented along the first alignment direction and electrically connected to the second conductive layer.

8. The touch panel as claimed in claim 7, wherein an arranged direction of the first plurality of carbon nanotube strings is along the second alignment direction, and an arranged direction of the second plurality of carbon nanotube strings is along the first alignment direction.

9. The touch panel as claimed in claim 1, further comprising an insulative layer located on edges of the upper surface of the second electrode plate and insulating the first electrode plate from the second electrode plate.

10. The touch panel as claimed in claim 9, wherein one or more of dot spacers are located between the first conductive layer and the second conductive layer.

11. The touch panel as claimed in claim 1, further comprising a shielding layer located on a lower surface of the second substrate, and material of the shielding layer being selected from the group consisting of indium tin oxides, antimony tin oxides, and carbon nanotube films.

12. The touch panel as claimed in claim 1, further comprising a transparent protective film located on an upper surface of the first electrode plate, and material of the transparent protective film selected from the group consisting of silicon nitrides, silicon dioxides, benzocyclobutenes, polyester films, and polyethylene terephthalates.

13. The touch panel as claimed in claim 1, wherein the plurality of carbon nanotubes are unfunctionalized.

14. A display device comprising:
a touch panel comprising:
a first electrode plate comprising a first substrate and a first conductive layer located on a lower surface of the first substrate;
a second electrode separated from the first electrode plate and comprising a second substrate and a second conductive layer located on an upper surface of the second substrate; and
wherein at least one of the first and the second conductive layers comprises a plurality of carbon nanotube string-shaped structures spaced from each other, and each of the carbon nanotube string-shaped structures comprises a plurality of carbon nanotubes joined end to end by van der Waals attractive force, and
a display element opposite and adjacent to the touch panel.

15. The display device as claimed in claim 14, further comprising a first controller, a central processing unit, and a second controller; the display element is connected to the first controller, and the central processing unit is connected to the second controller.

16. The display device as claimed in claim 14, further comprising a passivation layer located on a surface of the touch panel, and material of the passivation layer being selected from the group consisting of silicon nitride and silicon dioxide.

17. A touch panel comprising:
a first electrode plate comprising a first substrate and a first conductive layer located on a lower surface of the first substrate; and
a second electrode plate separated from the first electrode plate and comprising a second substrate and a second conductive layer located on an upper surface of the second substrate;
wherein the first conductive layer comprises a plurality of first carbon nanotube strings parallel to each other and spaced apart from each other, the second conductive layer comprises a plurality of second carbon nanotube strings parallel to each other and spaced apart from each other, and an extending direction of the plurality of first carbon nanotube strings is different from an extending direction of the plurality of second carbon nanotube strings, each of the plurality of first carbon nanotube strings and the plurality of second carbon nanotube strings comprises a plurality of carbon nanotubes joined end to end by van der Waals attractive force therebetween.

18. The touch panel as claimed in claim 17, wherein the first electrode plate further comprises two first-electrodes located separately at opposite ends of the first conductive layer, a direction from one of the two first-electrodes across the first conductive layer to the other of the two first-electrodes being defined as a first direction, the second electrode plate further comprises two second-electrodes located separately at opposite ends of the first conductive layer, a direction from one of the two second-electrodes across the second conductive layer to the other of the two second-electrodes being defined as a second direction, the plurality of first carbon nanotube strings are parallel to the first direction, the plurality of second carbon nanotube strings are parallel to the second direction.

* * * * *